United States Patent [19]

Gras et al.

[11] Patent Number: 5,616,658

[45] Date of Patent: Apr. 1, 1997

[54] PROCESS FOR THE PRODUCTION OF MATT EPOXY RESIN AND HYBRID POWDER COATINGS

[75] Inventors: Rainer Gras, Bochum; Elmar Wolf, Recklinghausen, both of Germany

[73] Assignee: Huels Aktiengesellschaft, Marl, Germany

[21] Appl. No.: 370,644

[22] Filed: Jan. 10, 1995

[30] Foreign Application Priority Data

Jan. 14, 1994 [DE] Germany .......................... 44 00 930.5
Feb. 2, 1994 [DE] Germany .......................... 44 03 129.7

[51] Int. Cl.$^6$ .......................... C08F 20/00; C08G 59/14; C08G 59/40
[52] U.S. Cl. .......................... 525/438; 525/533; 525/934; 528/93; 528/94; 528/112; 528/113; 528/114; 528/115; 528/117; 528/118; 528/120; 528/121; 528/124; 528/289; 528/292
[58] Field of Search ........................ 525/438, 533, 525/934; 528/93, 94, 112, 113, 114, 115, 117, 118, 120, 121, 124, 289, 292, 369

[56] References Cited

U.S. PATENT DOCUMENTS

| | | | |
|---|---|---|---|
| 3,497,524 | 2/1970 | Payne et al. | 525/507 |
| 3,947,384 | 3/1976 | Schulde et al. | 528/114 |
| 4,130,510 | 12/1978 | Tawaka et al. | 528/114 |
| 4,390,688 | 6/1983 | Walz et al. | 525/438 |
| 4,496,710 | 1/1985 | Gude et al. | 528/114 |

FOREIGN PATENT DOCUMENTS

| | | |
|---|---|---|
| 0253115 | 1/1988 | European Pat. Off. . |
| 60-1221 | 1/1985 | Japan . |
| WO91/08268 | 6/1991 | WIPO . |

OTHER PUBLICATIONS

Database WPI, Derwent Publications, AN-82-20513E, JP-57-021465, Feb. 4, 1982.
Patent Abstracts of Japan, vol. 7, No. 277 (C-199), Dec. 9, 1983, JP-58-154715, Sep. 14, 1983.

*Primary Examiner*—Thomas Hamilton, III
*Assistant Examiner*—Randy Gulakowski
*Attorney, Agent, or Firm*—Oblon, Spivak, McClelland, Maier & Neustadt, P.C.

[57] ABSTRACT

A curing agent for a composition useful for the production of matt epoxy resin and hybrid powder coatings, comprising a mixture of a) salts of phthalic acid, isophthalic acid and terephthalic acid with the following amines

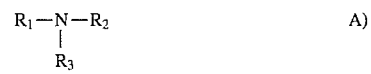

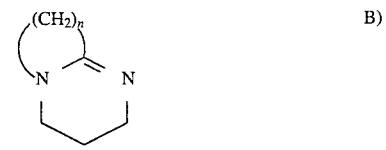

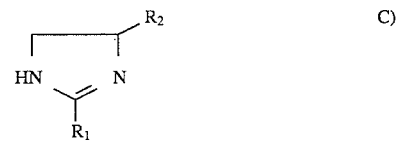

in which $R_1$, $R_2$ and $R_3$ are identical or different aliphatic, cycloaliphatic, araliphatic or aromatic hydrocarbon radicals having 1–20 carbon atoms and in which one or more $CH_2$ groups in the carbon chain may be replaced by O atoms, by $NR_4$ groups where $R_4=C_{1-6}$-alkyl, CH—OH groups, and/or one or more terminal methyl groups may be replaced by dialkyl-substituted amino groups having 1 to 6 carbon atoms, and $R_1$ and $R_2$ may form a joint ring in which one $CH_2$ group may be replaced by an O atom or by an $NR_4$ group, and $R_1=R_2=R_3$—$CH_2$—$CH_2$— attached via a common nitrogen atom, and n=3–11, and 0.5–2 mol of amine A)–C) per mole of acid, and b) pyromellitic acid and/or trimellitic acid, 0.25–2 mol of b) being employed per mole of a).

5 Claims, No Drawings

PROCESS FOR THE PRODUCTION OF MATT EPOXY RESIN AND HYBRID POWDER COATINGS

BACKGROUND OF THE INVENTION

1. Field of the Invention

The present invention relates to a process for the production of matt epoxide and hybrid powder coatings.

2. Description of the Background

DE-A 2324 696 describes a process for the production of matt coatings, in which epoxy resins are cured using salts of aromatic polycarboxylic acids, especially pyromellitic acid, and cyclic amidines. An essential feature of this process described in DE-A 23 24 696 is that it is not the individual components but their reaction products, the salts, which are employed.

Furthermore, it is known that equally matt surfaces to those above are, in fact, prepared by the simultaneous use of two individual curing agents, cyclic amidine and polycarboxylic acid, as is the case when the matt curing agent in salt form, consisting of the same individual components, is employed. However, in this case, surface texturing must be considered, as well as the possibility of poor physical properties of the product.

It is also known that only salts of cyclic amidines with trimellitic acid and/or pyromellitic acid are suitable for the production of matt epoxy powder coatings. The corresponding salts of phthalic acid, isophthalic acid and terephthalic acid, on the other hand, cure with epoxy resins to give glossy films.

A need therefore continues to exist for a curing agent to prepare matt surfaces of improved characteristics.

SUMMARY OF THE INVENTION

Accordingly, one object of the invention is to prepare additional matt curing agents.

Briefly, this object and other objects of the present invention as hereinafter will become more readily apparent can be attained in a curing agent for the production of matt epoxy resin and hybrid powder coatings which is a mixture of:

a) salts of phthalic acid, isophthalic acid and terephthalic acid with at least one of the amines:

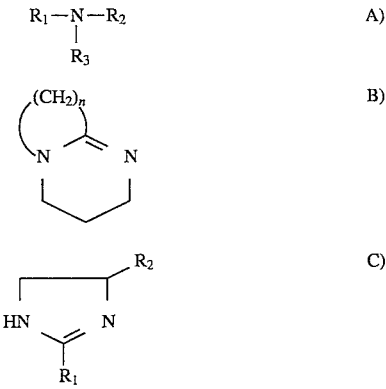

in which $R_1$, $R_2$ and $R_3$ are identical or different aliphatic, cycloaliphatic, araliphatic or aromatic hydrocarbon radicals having 1–20 carbon atoms and in which one or more $CH_2$ groups in the carbon chain may be replaced by O atoms, by $NR_4$ groups where $R_4=C_{1-6}$-alkyl, CH—OH groups, and/or one or more terminal methyl groups may be replaced by dialkyl-substituted amino groups having 1 to 6 carbon atoms, and $R_1$ and $R_2$ may form a joint ring in which one $CH_2$ group may be replaced by an O atom or by an $NR_4$ group, and $R_1=R_2=R_3=-CH_2-CH_2-$ attached via a common nitrogen atom, and n=3–11, and 0.5–2 mol of amine A)–C) react per mole of acid, and b) pyromellitic acid and/or trimellitic acid, 0.25–2 mol of b) being employed per mole of a).

DETAILED DESCRIPTION OF THE PREFERRED EMBODIMENTS

Surprisingly it has now been found that matt epoxy and hybrid powder coatings are obtained, without having to accept an impairment of the coating performance properties, if salts of isophthalic, terephthalic and phthalic acid containing pyromellitic acid and/or trimellitic acid in the mixture are employed as a curing component, i.e., if the curing component used comprises mixtures of salts of phthalic, isophthalic and terephthalic acid with pyromellitic acid and/or trimellitic acid as the free acids.

The salts of phthalic acid, isophthalic acid and terephthalic acid which can be employed in the process of the invention contain, as amine component, nitrogen compounds which are capable of forming salts, for example N,N-dimethylcyclohexylamine (DMCA), N,N-dimethylaniline, N-methylmorpholine, N,N'-dimethylpiperazine, 2,2,6,6-tetramethyl-4-dimethylaminopiperidine, N,N-dimethyloctadecylamine, 1,8-diazabicyclo[5.4.0]undec-7-ene (Undec), N,N,N',N'-tetramethylhexamethylenediamine, 2-phenylimidazoline (B 31) and 1,4-diazabicyclo[2,2,2]octane (DABCO).

The basic nitrogen content of the salts which can be employed in the present process is 1–11 mmol/g; while the carboxyl group content is 4–18 mmol/g.

The curing agent mixtures a)+b) which are employed for the production of the pulverulent coating compositions of matt appearance, in the present invention, are prepared in 2 stages, comprising a first stage of the formation of salt A) and, after salt formation is complete, a second step of adding the pyromellitic acid and/or trimellitic acid, after which the solvent is removed. Some of the salts a) are known and are also not a subject of the invention. They are prepared in a known manner by adding the amine component A), B) and/or C) in portions to a solution in water or ethanol of phthalic, isophthalic and terephthalic acid, at the boiling temperature. When the addition of amine is complete, heating is continued for about one hour more. Then the pyromellitic and/or trimellitic acid are/is added with intensive stirring. Subsequently, the solvent is removed by distillation; it is not necessary for the pyromellitic and/or trimellitic acid to be dissolved.

For the quantitative removal of the solvent, the reaction mixture is dried in a vacuum drying cabinet at 60° C. for about 10 h. The salts a) are composed of 1 mol of phthalic acid and/or isophthalic acid and/or terephthalic acid and 0.5–2 mol of amine A), B), C). The curing agent mixture a)+b) according to the invention comprises 1 mol of aromatic dicarboxylic acid (as salt) and 0.25–2 mol of pyromellitic and/or trimellitic acid.

As already mentioned at the beginning, the curing agent mixture a)+b) is suitable for the production of matt epoxide and hybrid powder coatings, as described in, for example, DE-A 23 24 696.

For production of a pulverulent coating composition with matt appearance, based on polyepoxide and, if desired, on polymers which contain carboxyl groups, the curing agent mixture a)+b) is employed in quantities of 3–14% by weight, based on the sum of epoxy resin and the polymer which contains COOH groups and may be present, with 0.25–2 mol of pyromellitic and/or trimellitic acid being present per mole of aromatic dicarboxylic acid (as salt). The polyepoxides used are solid, resinous substances which melt in the range 60°–150° C., preferably 70°–110° C., and which contain on average more than one 1,2-epoxide group per molecule. In principle, all compounds are suitable which contain more than one 1,2-epoxide group per molecule; however, preference is given to commercially available epoxy resins as are obtained by the reaction of bisphenol A and epichlorohydrin, having an epoxide equivalent weight of 400–3000, preferably 800–1000.

The polymers containing carboxyl groups are polyester-polycarboxylic acids which are prepared from polyols and polycarboxylic acids and/or there derivatives. The melting range of these acidic polyesters is from 60°–160° C., preferably 80°–120° C.; their acid number varies from 10–150 mg of KOH/g, preferably 30–60 mg of KOH/g. The OH numbers should be below 10 mg of KOH/g.

Suitable examples of polycarboxylic acids employed for the preparation of the polyester-polycarboxylic acids include oxalic, adipic, 2,2,4-(2,4,4-)trimethyladipic, azelaic, sebacic, decanedicarboxylic, dodecanedicarboxylic, fumaric, phthalic, isophthalic, terephthalic, trimellitic and pyromellitic acid. Suitable polyols for the acidic polyester include ethylene glycol, 1,2- and 1,3-propanediol, 1,2-, 1,3-, 1,4- and 2,3-butanediol, 1,5-pentanediol, 3-methyl-1,5-pentanediol, neopentylglycol, 1,12-dodecanediol, 2,2,4-(2,4,4-)trimethyl-1,6-hexanediol, trimethylolpropane, glycerol, pentaerythritol, 1,4-bishydroxymethylcyclohexane, cyclohexane-1,4-diol, diethylene glycol, triethylene glycol and dipropylene glycol. It is of course also possible to react polyesters which contain hydroxyl groups, and which are prepared by known methods from polycarboxylic acids and polyols, with polycarboxylic acids and/or polycarboxylic acid anhydrides to give the polyester-polycarboxylic acids.

The quantities of the individual powder coating binder components can be varied substantially.

In the case where commercially available epoxy resins based on bisphenol A (+ epichlorohydrin) are used exclusively, the concentration of curing agent is 3–14% by weight. Where mixtures are used of epoxy resins of bisphenol A diglycidyl ester and carboxyl group-containing polyester type, the proportion depends on the acid number of the carboxy polyester. For example, at an acid number of 30–50 mg of KOH/g the weight ratio of epoxy resin to carboxy polyester is usually from 60:40 to 80:20, preferably 70:30. The concentration of the curing agent mixture a)+b) in these epoxy resins/carboxy polyester mixtures is 2–10% by weight. For the production of the powder coating, the binders are first mixed together with the levelling agent, pigment and/or filler and the UV and oxidation stabilizers, and homogenized in an extruder at about 100° C. The extruded composition is cooled to room temperature and then ground to a powder coating whose average particle size should be about 40–80 μm, preferably 50 μm.

The application of the powder coatings produced in this manner to suitable substrates can be carried out by the known processes, for example by electrostatic powder spraying or fluidized-bed sintering. After the application of the powder coating by one of the processes mentioned, the coated substrates are heated at temperatures of 150°–220° C. for periods of 30 secs–8 min, for purposes of curing. The coating films produced in this way are distinguished by very good levelling, outstanding solvent resistance and a matt surface, it being possible to adjust the degree of gloss as desired within a wide range.

Having generally described this invention, a further understanding can be obtained by reference to certain specific examples which are provided herein for purposes of illustration only and are not intended to be limiting unless otherwise specified.

I. Preparation of the salts according to the invention General preparation procedure:

The amine is added in portions to the aromatic dicarboxylic acid (isophthalic, terephthalic and/or phthalic acid) which is heated with from 6 to 10 times the amount of ethanol and/or $H_{2O}$ to the boiling point of the solvent. When the addition of amine is complete, heating is continued for about 1 h more. Subsequently, pyromellitic acid (PMA) dissolved in ethanol and/or $H_2O$ is added in portions. After the addition of PMA, the solvent is removed, generally by distillation. For the quantitative removal of the solvent the reaction product is additionally treated in a vacuum drying cabinet at about 60° C.

TABLE 1

Salt examples

| | Mole | | | | | |
|---|---|---|---|---|---|---|
| Example No. | Isophthalic acid | Amine | Pyromellitic acid | M.p. °C. | N mmol/g | COOH mmol/g |
| 1 | 0.5 | 0.25 B 31 0.25 DMCA | 0.5 | 217–223 | 2.69 | 10.50 |
| 2 | 0.5 | 0.5 DMCA | 0.5 | 188–197 | 1.51 | 10.50 |
| 3 | 0.5 | 0.5 DMCA | 0.25 | 177–185 | 2.25 | 9.32 |
| 4 | 0.5 | 0.5 B 31 | 0.5 | 213–217 | 3.41 | 8.92 |
| 5 | 0.5 | 0.5 B 31 | 0.5 | 212–220 | 3.35 | 8.85 |
| 6 | 0.5 | 0.5 B 31 | 0.625 | 188–193 | 3.18 | 9.52 |
| 7 | 0.5 | 1 B 31 | 0.5 | 208–215 | 5.56 | 7.04 |
| 8 | 0.5 | 0.5 B 31 | 0.75 | 210–215 | 2.W | 7.75 |
| 9 | 0.5 | 1 B 31 | 1 | 185–189 | 4.14 | 8.27 |
| 10 | 0.25 | 1 B 31 | 0.75 | 204–214 | 5.10 | 9.10 |
| 11 | 0.5 | 0.5 Undec | 0.5 | 189–196 | 3.49 | 8.70 |
| 12 | 0.5 | 1 Undec | 0.5 | 225–230 | 5.47 | 5.51 |

TABLE 1-continued

Salt examples

| Example No. | Isophthalic acid | Amine | Pyromellitic acid | M.p. °C. | N mmol/g | COOH mmol/g |
|---|---|---|---|---|---|---|
| 13 | 0.5 | 0.25 Undec 0.25 B 31 | 0.5 | 198–207 | 3.47 | 8.73 |
| 14 | 0.5 | 0.5 Undec 0.5 B 31 | 0.5 | 230–235 | 5.51 | 5.50 |
| 15 | 0.5 | 0.5 DABCO | 0.5 | >250 | 3.76 | 9.39 |
| 16 | 0.5 | 1 DABCO | 0.5 | >250 | 6.2 | 6.2 |
| 17 | 0.5 | 0.25 DABCO 0.25 B 31 | 0.5 | 238–247 | 3.64 | 9.11 |
| 18 | 0.5 terephthalic acid | 1 B 31 | 0.5 | 248–253 | 5.35 | 7.1 |
| 19 | 0.5 terephthalic acid | 0.5 DMCA | 0.5 | 206–215 | 2.81 | 8.6 |
| 20 | 0.5 terephthalic acid | 1 B 31 | 0.5 | 248–250 | 5.38 | 7.2 |
| 21 | 0.5 terephthalic acid | 1 N—$CH_2$—$CH_2$—N—$CH_2$—$CH_2$—N | 0.5 | 212–219 | 5.2 | 7.76 |
| 22 | 0.5 terephthalic acid | 1 Undec | 0.5 | 246–253 | 5.49 | 5.50 |
| 23 | 0.5 phthalic acid | 0.5 DMCA | 0.5 | 171–179 | 1.81 | 9.08 |
| 24 | 0.5 phthalic acid | 0.25 DMCA 0.25 B 31 | 0.5 | 199–207 | 3.57 | 8.91 |
| 25 | 0.5 phthalic acid | 0.5 B 31 | 0.5 | 198–202 | 3.30 | 10.4 |
| Comparison Examples | | | | | | |
| 26 | 1 isophthalic acid | 1 B 31 | — | 145–152 | 6.20 | 6.4 |
| 27 | 1 tere- acid | 0.5 B 31 | — | 239–246 | 3.70 | 8.2 |

II. Epoxy resin

In the application examples, the epoxy resin compounds employed were those based on bisphenol A. They have the following characteristics:

| Example II.I | |
|---|---|
| Characteristics | |
| equivalent weight | 900–1000 |
| epoxide value | 0.1–0.111 |
| hydroxyl value | 0.34 |
| melting range | 96–104° C. |

III. Epoxy resin powder coatings

For the preparation of the powder coatings the ground products—curing agent, epoxy resin and levelling agent masterbatch*—are intimately mixed with the white pigment ($TiO_2$) in an edge runner mill and subsequently homogenized in an extruder at from 90° to 110° C. After cooling, the extrudate was fractionated and ground in a pin mill to a particle size <100 μm. The powder produced in this way was applied using an electrostatic powder spraying unit at 60 kV to degreased and, if appropriate, pretreated steel panels which were based in a circulating-air laboratory drying cabinet.

*Levelling agent masterbatch. 10% by weight of levelling agent based on polymeric butyl acrylates is homogenized in the melt with the epoxy resins and comminuted after solidifying.

The abbreviations in the following tale denote:

| LT | = | air thickness (μm) | |
|---|---|---|---|
| CH | = | crosshatch test | (DIN 53 151) |
| EI | = | Erichsen indentation (mm) | (DIN 53 156) |
| GG 50° ⋖ | = | Gardner gloss | (ASTM-D 523) |
| Imp. rev. | = | impact reverse (g · m) | |

The calculation of the coating formulations was made according to the following scheme:

| | % by weight EP = epoxide |
|---|---|
| B − C = EP | B = % by weight binder |
| | C = % by weight crosslinking agent |
| B = 100 − A | A = % by weight additives |
| | [40% by weight white pigment ($TiO_2$), |
| | 0.5% by weight levelling agent] |

| | Crosslinking agent | | Coating Examples | | | | |
|---|---|---|---|---|---|---|---|
| | | | Mechanical characteristics | | | | |
| Example III | % by wt. | acc. to | Curing °C./min | LT | CH | EI | Imp. rev. | GG 60° |

| Example III | % by wt. | acc. to | Curing °C./min | LT | CH | EI | Imp. rev. | GG 60° |
|---|---|---|---|---|---|---|---|---|
| 1 | 5 | I.1 | 200 12 | 70–80 | 0 | 7.3–7.8 | 460.8 | 10 |
| | | | 15 | 80 | 0 | 8.2–8.5 | 806.4 | 12 |
| | | | 180 20 | 50–60 | 0 | 7.3 | 345.6 | 13–15 |
| 2 | 5 | I.2 | 200 15 | 50–60 | 0 | 5.6–6.1 | 115.2 | 10 |
| | | | 20 | 60–70 | 0 | 5.8–6.7 | 115.2 | 9 |
| 3 | 5 | I.4 | 200 12 | 50–55 | 0 | 9.3 | 806.4 | 9 |
| | | | 15 | 60–70 | 0 | 9.1–9.5 | >944.6 | 8 |
| | | | 180 15 | 60–65 | 0 | 9.4 | >944.6 | 13 |
| | | | 170 25 | 50–60 | 0 | 9.3 | 806.4 | 14 |
| 4 | 5 | I.5 | 200 12 | 50–65 | 0 | 8.8–9.1 | 691.2 | 9 |
| | | | 15 | 60–70 | 0 | 9.3–9.5 | >944.6 | 9 |
| 5 | 5 | I.6 | 200 12 | 55–65 | 0 | 6.0–6.5 | 115.2 | 9–10 |
| | | | 15 | 60–70 | 0 | 6.7–7.4 | 230.4 | 9–10 |
| | | | 180 20 | 60–65 | 0 | 5.4–6.8 | 115.2 | 14–16 |
| 6 | 5 | I.9 | 200 10 | 60–75 | 0 | 4.3–5.1 | 115.2 | 5–6 |
| | | | 15 | 65–85 | 0 | 6.4 | 691.2 | 5–6 |
| | | | 180 15 | 55–65 | 0 | 6.5–7.0 | 115.2 | 7–8 |
| | | | 20 | 60–70 | 0 | 7.5–9.1 | 806.4 | 6 |
| | | | 170 25 | 50–70 | 0 | 7.1 | 115.2 | 10–11 |
| 7 | 5 | I.11 | 200 15 | 50–60 | 0 | 4.5–5.3 | <115.2 | 25–27 |
| | | | 20 | 60–75 | 0 | 6.7–7.4 | 230.4 | 27–28 |
| | | | 180 25 | 55–65 | 0 | 5.2–5.8 | <115.2 | 30–33 |
| 8 | 5.5 | I.15 | 200 20 | 55–65 | 0 | 4.4–5.1 | <115.2 | 25–31 |
| | | | 30 | 60–70 | 0 | 6.7–7.7 | 230.4 | 33–36 |
| | | | 180 30 | 60–70 | 0 | 4.9–5.5 | 115.2 | 30–35 |
| 9 | 5.5 | I.17 | 200 15 | 60–70 | 0 | 4.9–5.6 | 115.2 | 22–25 |
| | | | 25 | 55–75 | 0 | 6.8–7.5 | 230.4 | 24–27 |
| | | | 180 25 | 65–80 | 0 | 5.4–6.3 | 115.2 | 29–33 |
| 10 | 5 | I.21 | 200 15 | 50–60 | 0 | 7.5–7.7 | >944.6 | 36 |
| | | | 180 20 | 60–70 | 0 | 7.0–7.3 | 691.2 | 39 |
| 11 | 5 | I.25 | 200 12 | 50–65 | 0 | 6.5–6.8 | 115.2 | 11–12 |
| | | | 15 | 65–70 | 0 | 7.0–7.1 | 345.6 | 12 |
| | | | 180 20 | 70–90 | 0 | 7.2 | 115.2 | 13–14 |
| Comparison Examples | | | | | | | | |
| 12 | 6 | I.26 | 200 15 | 65–70 | 0 | 0.5–0.9 | <115.2 | 28 |
| | | | 30 | 60–70 | | 0.6–0.8 | <115.2 | 24 |
| 13 s | 8 | I.26 | 200 15 | 70–75 | 0 | 0.4–0.5 | <115.2 | 18 |
| | | | 30 | 55–70 | 0 | 0.5–0.7 | <115.2 | 22 |
| 14 | 5 | I.27 | 200 15 | 70 | 0 | 5.4–7.2 | 230.4 | 76 |
| | | | 30 | 50–60 | 0 | 6.5–8.0 | 345.6 | 70 |
| 15 | 7 | I.27 | 200 15 | 70–80 | 0 | 6.7–8.1 | 806.4 | 61 |
| | | | 30 | 65–70 | 0 | 8.6–9.5 | >944.6 | 59 |

IV. Carboxyl group-containing polyester

For the production of hybrid powder coatings, the carboxyl group-containing polyesters described below were employed, having the following characteristics:

| | I | II |
|---|---|---|
| Acid number: | 52–58 mg of KOH/g | 36 mg of KOH/g |
| Melting range: | 104–106° C. | 91–94° C. |
| Glass transition temperature: | about 58° C. | 64° C. |
| Viscosity at 160° C.: | 33,400 mPa · s | 58,000 mPa · s |

V. Hybrid powder coatings

The processing of the raw materials, the preparation and application were carried out as described in III above.

| Example | Crosslinking agent % by wt. acc. to | Curing °C./min | LT | CH | EI | Imp. rev. | GG 60° |
|---|---|---|---|---|---|---|---|
| 1 | 30 I.4 | 200 | 60– | 0 | 6.3– | 115.2 | 25 |
|   | 315 II.1 | 12 |  70 | 0 | 7.0 | 230.4 | 26 |
|   | 205 IV.1 | 15 | 50L– |   | 7.2– |   |   |
|   | 400 |   | 60 | 0 | 8.0 | 115.2 | 25 |
|   | TiO$_2^x$ | 180 |   |   |   |   |   |
|   | 50 | 25 | 55– |   | 5.5– |   |   |
|   | level. |   | 60 |   | 6.5 |   |   |
|   | MB$^x$ |   |   |   |   |   |   |
| 2 | 50 I.14 | 200 | 45– | 0 | 6.5– | 115.2 | 17 |
|   | 350 II.1 | 10 | 60 | 0 | 7.8 | 345.6 | 18 |
|   | 150 IV.2 | 15 | 55– |   | 7.4– |   |   |
|   | 400 TiO$_2$ |   | 65 | 0 | 8.4 | 115.2 | 20 |
|   | 50 | 180 |   | 0 |   | 115.2 | 21 |
|   | level. | 20 | 60– |   | 5.7– |   |   |
|   | MB$^x$ | 25 | 70 |   | 6.4 |   |   |
|   |   |   | 65– |   | 6.5– |   |   |
|   |   |   | 75 |   | 6.9 |   |   |
| 3 | 50 I.5 | 200 | 50– | 0 | 6.3– | 115.2 | 13 |
|   | 350 II.1 | 12 | 60 | 0 | 7.4 | 230.4 | 14 |
|   | 150 IV.1 | 15 | 60– |   | 7.5– |   |   |
|   | 400 TiO$_2$ |   | 70 | 0 | 8.1 | < | 16 |
|   | 50 | 180 |   |   |   | 115.2 |   |
|   | level. | 25 | 55– |   | 5.3– |   |   |
|   | MB$_x$ |   | 70 |   | 6.4 |   |   |

Notes:
$^x$TiO$_2$ (white pigments); level. MB (levelling agent masterbatch)

Having now fully described the invention, it will be apparent to one of ordinary skill in the art that many changes and modifications can be made thereto without departing from the spirit or scope of the invention as set forth herein.

What is claimed as new and desired to be secured by letters patent of the United States is:

1. A curing agent for a composition useful for the production of matt epoxy resin and hybrid powder coatings, comprising a mixture of
   a) salts of phthalic acid, isophthalic acid and terephthalic acid with at least one of the following amines $$R_1-N-R_2 \quad A) \\ \quad \mid \\ \quad R_3$$

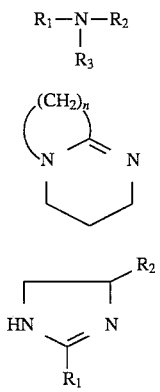

B)

C)

in which $R_1$, $R_2$ and $R_3$ are identical or different aliphatic, cycloaliphatic, araliphatic or aromatic hydrocarbon radicals having 1–20 carbon atoms and in which one or more $CH_2$ groups in the carbon chain may be replaced by 0 atoms, by $NR_4$ groups where $R_4=C_{1-6}$-alkyl, CH—OH groups, and/or one or more terminal methyl groups may be replaced by dialkyl-substituted amino groups having 1 to 6 carbon atoms, and $R_1$ and $R_2$ may form a joint ring in which one $CH_2$ group may be replaced by an O atom or by an $NR_4$ group, and $R_1$, $R_2$, $R_3=$—$CH_2$—$CH_2$— and n=3–11, and 0.5–2 mol of amine A)–C) per mole of acid, and b) pyromellitic acid and/or trimellitic acid, 0.25–2 mol of b) being employed per mole of a).

2. A composition useful for the production of matt epoxy resin and hybrid powder coatings, comprising a mixture of:
   an epoxy resin, optionally a polymer which contains carboxyl groups and the curing agent of claim 1.

3. The composition of claim 2, wherein the concentration of curing agent ((a)+(b)) in the powder formulation is 3–14% by wt., based on the sum of epoxy resin plus the polymer which contains COOH groups.

4. A process for the production of matt epoxy resins and hybrid powder coatings, comprising:
   applying the composition of claim 1 to a substrate, and
   heating the applied powder composition thereby forming a matt finish.

5. The process of claim 4, wherein the applied powder coating is heated to 150°–220° C. for 30 secs–8 min.

* * * * *